(12) United States Patent
Motoi

(10) Patent No.: US 9,378,568 B2
(45) Date of Patent: Jun. 28, 2016

(54) ELECTRONIC APPARATUS AND DISPLAYING METHOD

(71) Applicant: Kabushiki Kaisha Toshiba, Minato-ku, Tokyo (JP)

(72) Inventor: Shigeru Motoi, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 14/444,363

(22) Filed: Jul. 28, 2014

(65) Prior Publication Data

US 2015/0170383 A1    Jun. 18, 2015

(30) Foreign Application Priority Data

Dec. 13, 2013    (JP) .................................. 2013-258312

(51) Int. Cl.
| | | |
|---|---|---|
| G06F 3/041 | (2006.01) | |
| G06T 11/20 | (2006.01) | |
| G06F 3/0488 | (2013.01) | |
| G06F 3/0354 | (2013.01) | |

(52) U.S. Cl.
CPC .......... *G06T 11/203* (2013.01); *G06F 3/03545* (2013.01); *G06F 3/0416* (2013.01); *G06F 3/04883* (2013.01)

(58) Field of Classification Search
CPC ..... G06T 11/203; G06T 11/001; G06F 3/038; G06F 3/0416; G06F 3/041; G06F 3/04883; G06F 3/03545
USPC .................................................. 345/156–184
See application file for complete search history.

(56) References Cited

U.S. PATENT DOCUMENTS

| | | | | |
|---|---|---|---|---|
| 2002/0085003 | A1* | 7/2002 | Nagashima ........... | G06T 11/001 345/441 |
| 2010/0044121 | A1* | 2/2010 | Simon ................. | G06F 3/03547 178/18.03 |
| 2010/0066691 | A1* | 3/2010 | Li ........................ | G06F 3/04883 345/173 |
| 2013/0285925 | A1* | 10/2013 | Stokes .................... | G06F 21/31 345/173 |
| 2014/0300588 | A1* | 10/2014 | Nakada ............... | G06F 3/04845 345/179 |

FOREIGN PATENT DOCUMENTS

| | | |
|---|---|---|
| JP | H06-175777 A | 6/1994 |
| JP | H07-121350 A | 5/1995 |

* cited by examiner

*Primary Examiner* — Aneeta Yodichkas
*Assistant Examiner* — Gerald Oliver
(74) *Attorney, Agent, or Firm* — Knobbe, Martens Olson & Bear LLP

(57) ABSTRACT

According to one embodiment, an electronic apparatus is capable of drawing a line corresponding to contact on a sensor surface of a display. The apparatus includes a display processor. The display processor displays a plurality of lines in accordance with a locus of a single contact point on the sensor surface, and displays an object in a region near a position of the single contact point, at least part of the object overlapped with the plurality of lines, a color of the object corresponding to a color of the plurality of lines, wherein widths of the plurality of lines are varied in accordance with a pressure on the single contact point.

8 Claims, 6 Drawing Sheets

ELECTRONIC APPARATUS AND DISPLAYING METHOD

CROSS-REFERENCE TO RELATED APPLICATIONS

This application is based upon and claims the benefit of priority from Japanese Patent Application No. 2013-258312, filed Dec. 13, 2013, the entire contents of which are incorporated herein by reference.

FIELD

Embodiments described herein relate generally to technology of displaying a line by handwriting.

BACKGROUND

Recently, various electronic apparatuses such as tablets, PDAs and smartphones have been developed. To facilitate users' input operations, most of the electronic apparatuses comprise a contactscreen display. In addition, electronic apparatuses capable of inputting a line, etc. by a stylus have also been developed recently.

When a line is input by a stylus, the line drawn on a contactscreen display can be modified by designating a pen type. For example, a line color, a line width or a line type can be changed.

When the user is drawing the line on the contactscreen display, the user often feels uncomfortable on appearance of a middle part of the line which is being displayed on the contactscreen display, depending on the pen type.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus is capable of drawing a line corresponding to contact on a sensor surface of a display. The apparatus comprises a display processor. The display processor is configured to display a plurality of lines in accordance with a locus of a single contact point on the sensor surface, and to display an object in a region near a position of the single contact point, at least part of the object overlapped with the plurality of lines, a color of the object corresponding to a color of the plurality of lines, wherein widths of the plurality of lines are varied in accordance with a pressure on the single contact point.

Figure 1:
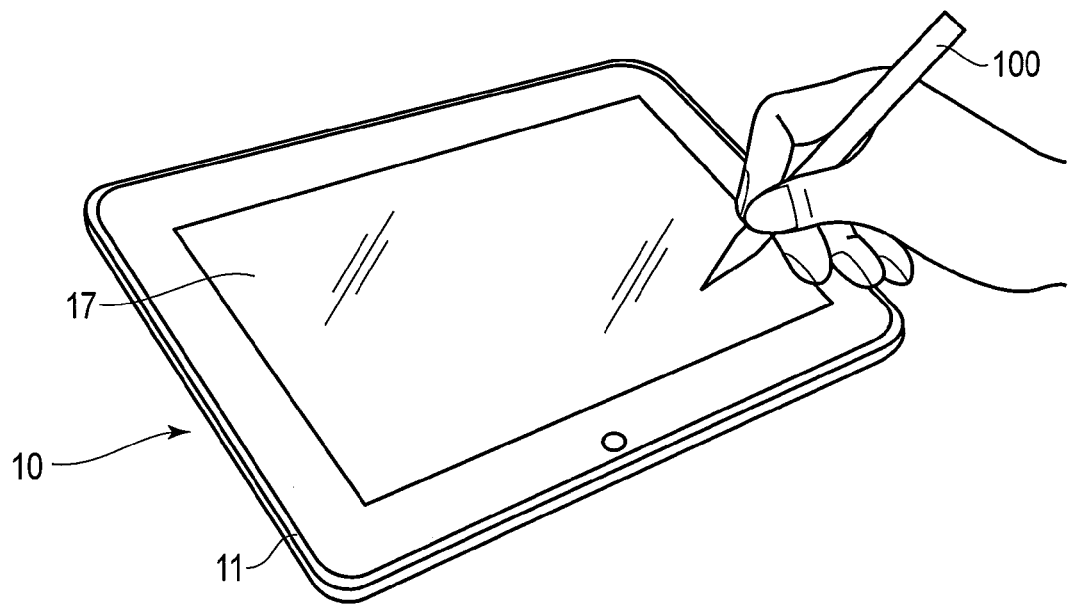
FIG. 1 is an exemplary perspective view showing a structure of an electronic apparatus of an embodiment.

FIG. 1 is a perspective view showing an appearance of an electronic apparatus according to the embodiment. The electronic apparatus is, for example, a portable electronic apparatus in which handwritten characters can be input by using a stylus (pen) or a finger. The electronic apparatus can be implemented as a tablet computer, a notebook-type personal computer, a smartphone, a PDA, etc. In the following descriptions, it is assumed that the electronic apparatus is implemented as a tablet computer 10. The tablet computer 10 is a portable electronic apparatus which may also be called a tablet or a slate computer, and comprises a main body 11 and a contactscreen display 17 as shown in FIG. 1. The contactscreen display 17 is mounted to be overlaid on a top surface of the main body 11.

The main body 11 comprises a housing shaped in a thin box. A flat panel display and a sensor (position detecting device) configured to detect a position designated on a screen of the flat panel display by a stylus or a finger are incorporated in the contactscreen display 17. The flat panel display may be, for example, a liquid crystal display (LCD). As the sensor (position detecting device), for example, a capacitive contactpanel, an electromagnetic induction type digitizer, etc., can be employed, and the sensor detects the position which the stylus or finger is in contact with or in proximity to. In the following descriptions, it is assumed that both of two types of sensors, i.e., a digitizer and a contactpanel, are incorporated in the contactscreen display 17.

Each of the digitizer and the contactpanel is provided to cover the screen of the flat panel display. The contactscreen display 17 can detect not only a contact operation using the finger on the screen, but also a contact operation on the screen using a stylus 100. The stylus 100 may be, for example, an electromagnetic induction type stylus. The user can perform a handwriting input operation using an external object (stylus 100 or finger), on the contactscreen display 17. A tip of the stylus 100 makes point contact with a single contact point on a surface (sensor surface) of the contactscreen display 17.

Figure 2:
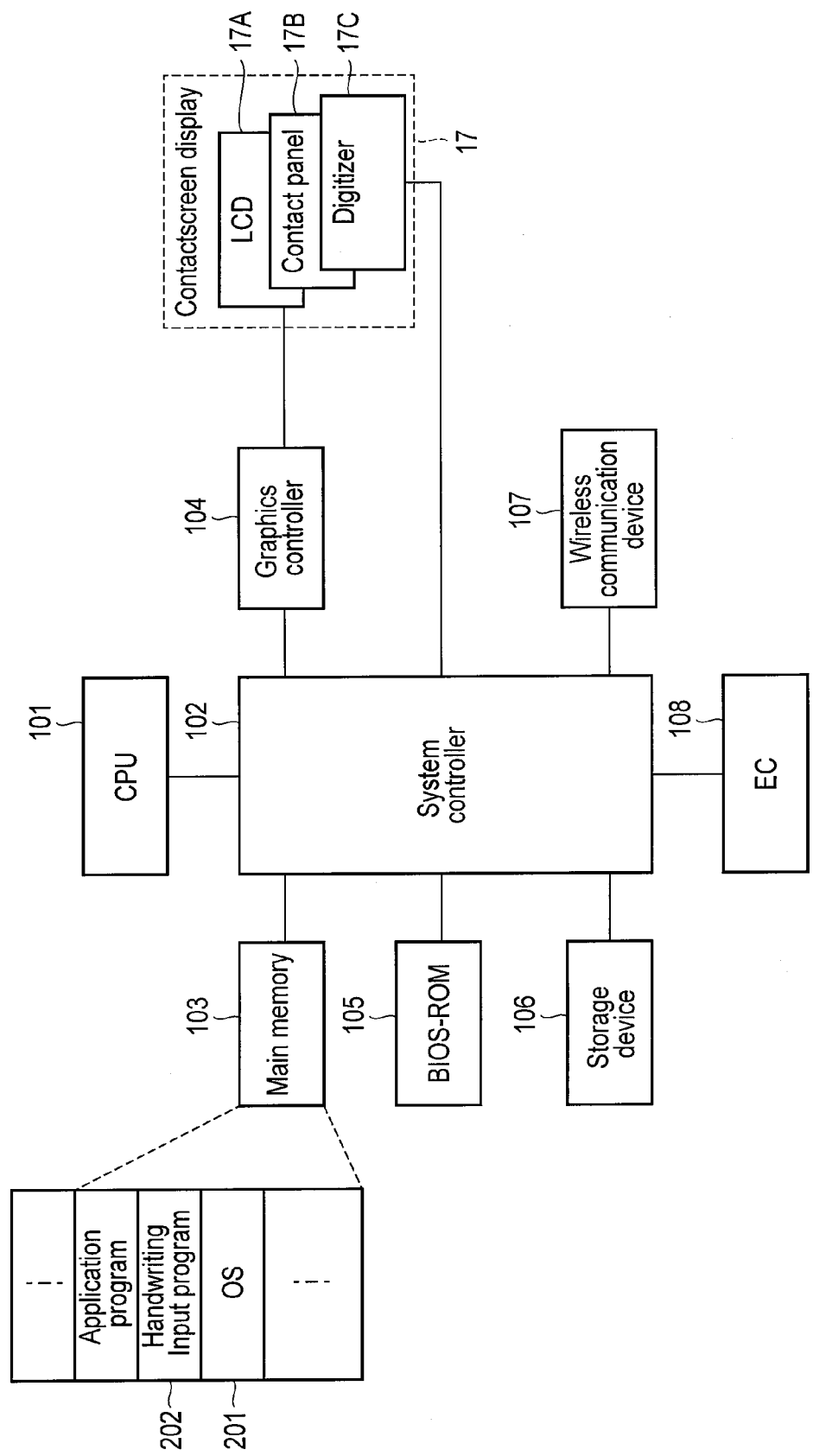
FIG. 2 is an exemplary block diagram showing a system configuration of the electronic apparatus of the embodiment.

FIG. 2 is a diagram showing a system configuration of the tablet computer 10 according to the embodiment.

As shown in FIG. 2, the tablet computer 10 comprises a CPU 101, a system controller 102, a main memory 103, a graphics controller 105, a BIOS-ROM 105, a storage device 106, a wireless communication device 107, an embedded controller (EC) 108, etc.

The CPU 101 is a processor for controlling operations of various modules in the tablet computer 10. The CPU 101 executes various programs loaded into the main memory 103 from the storage memory 106. The programs executed by the CPU 101 include an operating system (OS) 201 and various application programs such as a handwriting input program 202. The application programs 203 include, for example, a handwriting character recognition program, a browser program, an image editing program, a document generating program, etc.

The CPU 101 implements not only a function of generating note data (page data (time-series information)) in accordance with the handwriting input operation using the stylus 100 and a page editing function of editing a page included in a note file, but also various functions related to the generation and edition of the note file (or page), by executing the handwriting input program 202.

In addition, the CPU 101 also executes a Basic Input/Output System (BIOS) stored in the BIOS-ROM 105. The BIOS is a program for hardware control.

The system controller 102 is a device configured to make connection between a local bus of the CPU 101 and various components. A memory controller configured to control access to the main memory 103 is also built in the system controller 102. The system controller 102 also has a function of executing communication with the graphics controller 104 via a serial bus, etc.

The graphics controller 104 is a display controller configured to control an LCD 17A which is utilized as a display monitor of the tablet computer 10. A display signal generated by the graphics controller 104 is sent to the LCD 17A. The LCD 17A displays a screen image in accordance with the display signal. On the LCD 17A, a contact panel 17B and a digitizer 17C are arranged as position detecting devices. The contact panel 17B is a capacitive pointing device configured to input data on the screen of the LCD 17A. A contact position on the screen contacted by a finger, movement of the contact position, etc. are detected by the contact panel 17B. The digitizer 17C is an electromagnetic induction-type pointing device configured to input data on the screen of the LCD 17A. A contact position on the screen contacted by the stylus 100, movement of the contact position, etc. are detected by the digitizer 17C.

The wireless communication device 107 is a device configured to execute wireless communication such as wireless LAN or 3G mobile communication.

The EC 108 is a one-chip microcomputer comprising an embedded controller for power management. The EC 108 has a function of powering on or off the tablet computer 10 in accordance with a user operation of a power button.

Figure 3:
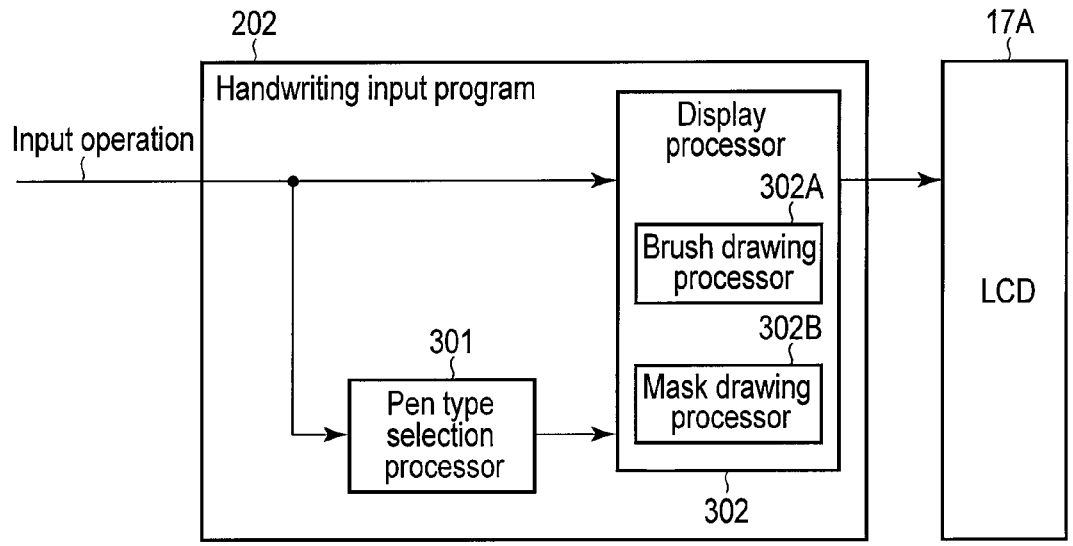
FIG. 3 is an exemplary block diagram showing a functional configuration of a handwriting note application program executed by the electronic apparatus of the embodiment.

FIG. 3 is a block diagram showing a configuration of the handwriting input program 202.

The handwriting input program 202 comprises a pen type selection processor 301, a display processor 302, etc.

The pen type selection processor 301 detects a pen type selected by using a user interface displayed on the LCD 17A and notifies the handwriting input program 202 of the detected pen type.

The display processor 302 executes processing of displaying a line corresponding to the notified pen type, based on coordinates of the contact position detected by the digitizer 17C.

The display processor 302 comprises a brush drawing processor 302A, a mask drawing processor 302B, etc.

The brush drawing processor 302A executes processing of drawing a line as drawn with a brush, in accordance with the detected position. If the tip of the stylus 100 contactes the surface (sensor surface) of the contactscreen display 17, the brush drawing processor 302A executes processing of drawing a line 401 as drawn with a brush, based on a position of the contact point detected by the digitizer 17C and a locus of the contact point.

Figure 4:
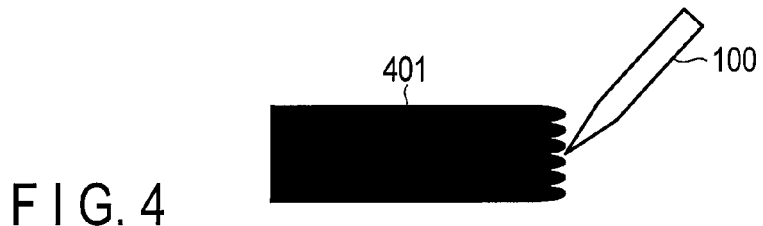
FIG. 4 is an exemplary illustration showing a line drawn when a line type is a brush.

The brush drawing processor 302A draws a plurality of lines parallel to a proceeding direction of the tip of the stylus, to draw the line 401 as drawn with a brush, as shown in FIG. 4. The brush drawing processor 302A determines widths of a plurality of lines in accordance with a pressure on the contact point (writing pressure). Each of the lines is drawn more widely by the brush drawing processor 302A as the writing pressure becomes higher. If the width of each line is equal to or greater than a half of an interval of adjacent lines, adjacent lines are drawn in a shape of a single line since they are drawn to be overlaid on each other. If the width of each line is smaller than a half of the interval of adjacent lines, a gap is formed between the adjacent lines and a plurality of lines are drawn to be blurred.

In addition, an outer line, of a plurality of lines, may be drawn narrowly as the writing pressure becomes lower. By drawing the lines in this manner, a central line is drawn to the end even if the writing pressure becomes gradually smaller while the tip of the stylus is in contact with the contactscreen display 17.

Incidentally, when a line is drawn in a state in which the writing pressure is low, drawn lines corresponding to respective brush bundles are seen around the narrow tip of the stylus 100, unlike an actual brush, and the user feels uncomfortable on appearance of the tip and a middle part of the line which the user is drawing.

Figure 5:
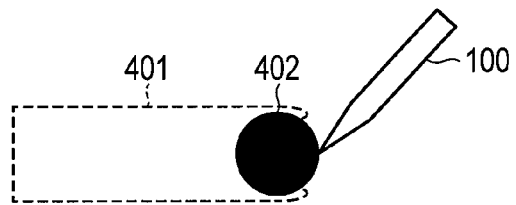
FIG. 5 is an exemplary illustration showing a mask object drawn when a line type is a brush.

The mask drawing processor 302B executes processing of drawing a mask object 402 to mask leading end portions of a plurality of lines on a layer above a layer where a plurality of lines are drawn, as shown in FIG. 5. A color of the object 402 corresponds to a color of a line 401 in accordance with movement of a position of the line end. For example, the color of the object 402 is the same as the color of the line 401.

Figure 6:
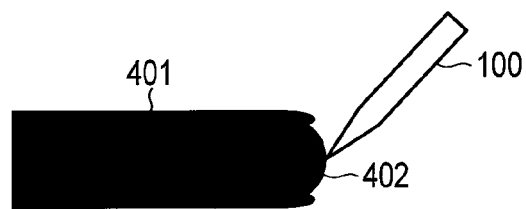
FIG. 6 is an exemplary illustration showing a mask object and a line drawn when a line type is a brush.

The display processor 302 draws the mask object 402 on the end of the line 401, as shown in FIG. 6. The position of the drawn mask object is changed. The mask object 402 is drawn on at least some lines, of a plurality of lines. A shape of the mask object 402 is, for example, a circle slightly smaller than a thickness of the line 401.

Figure 7:
FIG. 7 is an exemplary illustration showing a state of finishing writing a line.

If the tip of the stylus 100 is so remote from the surface of the contactscreen display 17 that the contact position on the surface of the contactscreen display 17 cannot be detected, the display processor 302 does not draw the mask object 402 on the line 401 as shown in FIG. 7. In other words, if the tip of the stylus 100 is so remote from the surface of the contactscreen display 17 that the contact position on the surface of the contactscreen display 17 cannot be detected, the display processor 302 stops the display of the mask object 402.

When the mask object 402 which aims to hide the leading end portion of the line 401 is drawn at the end of the line, a single line seems to flow and the uncomfortable feeling is reduced. Since the mask object 402 drawn at the end of the line is temporarily displayed and since the mask object 402 is not drawn on the display when writing the line is finished, a blurred state, split, etc. of the line can be easily expressed.

The brush drawing processor 302A displays a first line and a second line, of a plurality of lines, by lines of different thickness, in accordance with a shape of a locus of the contact point of the tip of the stylus 100 on the surface of the contactscreen display 17. For example, if the locus of the tip draws a curve, the brush drawing processor 302A determines the thickness of each line in accordance with a curvature of the curve. The mask drawing processor 302B determines the size and the display position of the object, in accordance with density of a display region of a plurality of lines (i.e., ratio of a line width to a region where the lines are displayed).

Figure 8:
FIG. 8 is an exemplary illustration of a character drawn by a brush.
Figure 9:
FIG. 9 is an exemplary illustration of a character drawn by a brush.
Figure 10:
FIG. 10 is an exemplary illustration of a character drawn by a brush.

As shown in FIG. 8 and FIG. 9, if the curvatures of the curves surrounded by broken lines, inner lines of the curves are drawn narrowly. As shown in FIG. 10, if the curvature of the curve surrounded by a broken line is not great, an outer line of the curve is drawn narrowly.

Figure 11:
FIG. 11 is an exemplary illustration of a line drawn when a curvature of a curve is greater than a threshold value.
Figure 12:
FIG. 12 is an exemplary illustration of a line drawn when a curvature of a curve is not greater than a threshold value.

In this case, a figure assembling a plurality of blurred lines is drawn as shown in FIG. 11 and FIG. 12. If a line is blurred or split, the mask object is drawn in a region where the density of the line displaying region is higher than a threshold value. In addition, the mask object is not drawn in a region where the density of the line displaying region is not higher than a threshold value. In other words, the position where the object 402 is displayed and the shape of the object 402 are determined in accordance with the intervals of the positions where a plurality of lines are drawn or the density of a plurality of lines.

FIG. 11 shows a line drawn when the curvature of the curve is greater than a threshold value. FIG. 12 shows a line drawn when the curvature of the curve is not greater than a threshold value.

Figure 13:
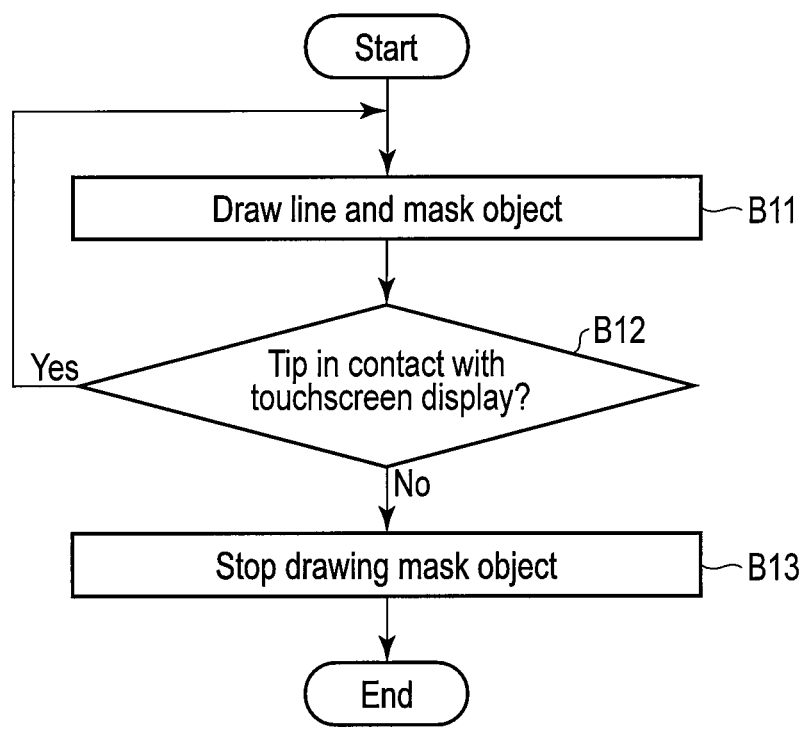
FIG. 13 is an exemplary flowchart showing steps of drawing a line when a brush is selected as a line type.

FIG. 13 is a flowchart showing steps of drawing a line when a brush is selected as the line type.

First, when the brush is selected as the line type and the tip of the stylus 100 contacts the surface (sensor surface) of the contactscreen display 17, the brush drawing processor 302A executes processing of drawing the line 401 as drawn by the brush, based on the position of the contact point detected by the digitizer 17C and the locus of the contact point. In addition, the mask drawing processor 302B executes processing of drawing the mask object 402 near the tip, in accordance with the position detected by the digitizer 17C (step B11). The display processor 302 draws graphics formed by drawing the mask object 402 on the line 401. The graphics drawn by the display processor 302 is drawn on the LCD 17A.

The display processor 302 discriminates whether the tip of the stylus 100 is in contact with the surface of the contactscreen display 17 (step B12). If the display processor 302 discriminates that the tip of the stylus 100 is in contact with the surface of the contactscreen display 17 (Yes in step B12), the line 401 and the mask object 402 are drawn in accordance with the contact position of the tip of the stylus 100. If the display processor 302 discriminates that the tip of the stylus 100 is not in contact with the surface of the contactscreen display 17 (No in step B12), the mask drawing processor 302B stops the processing of drawing the mask object 402 (step B13). Since the mask object 402 is not drawn, the mask object 402 is erased in the graphics displayed on the LCD 17A.

The intervals of the adjacent lines may be varied in accordance with the shape of the locus of the contact point of the tip of the stylus 100 on the surface of the contactscreen display 17. For example, if a plurality of lines includes a first line, a second line adjacent to the first line, and a third line adjacent to the third line, the brush drawing processor 302A may display an interval between the first line and the second line and an interval between the second line and the third line as intervals having different lengths.

According to the present embodiment, if the pen type is a brush, the line which is being drawn can be clearly seen by displaying the object on the leading end portion of the line. Therefore, uncomfortable feeling on the tip and the line which is being drawn can be suppressed.

In addition, since various types of processing of the present embodiment can be carried out by a computer program, the same advantages as those of the present embodiment can be easily achieved by merely installing the computer program in a general computer by means of a computer-readable storage medium which stores the computer program and executing the program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus capable of drawing a line corresponding to contacts on a sensor surface of a display, the apparatus comprising:
   a hardware processor configured to display a plurality of lines in accordance with a locus of a single contact point on the sensor surface, and to display an object in a region near a position of the single contact point, at least part of the object overlapping the plurality of lines, a color of the object corresponding to a color of the plurality of lines,
   wherein widths of the plurality of lines are varied in accordance with a pressure on the single contact point, and
   wherein a position where the object is displayed and a shape of the object are determined in accordance with an interval of positions where the plurality of lines are displayed or a density of the plurality of lines.

2. The apparatus of claim 1, wherein when the contact on the sensor surface is not detected, the hardware processor is configured to stop displaying the object.

3. An electronic apparatus capable of drawing a line corresponding to contacts on a sensor surface of a display, the apparatus comprising;
   a hardware processor configured to display a plurality of lines in accordance with a locus of a single contact point on the sensor surface, and to display an object in a region near a position of the single contact point, at least part of the object overlapping the plurality of lines, a color of the object corresponding to a color of the plurality of lines,
   wherein widths of the plurality of lines are varied in accordance with a pressure on the single contact point, and
   wherein the hardware processor is further configured to display a first line and a second line, of the plurality of lines, as having different widths, in accordance with a shape of the locus of the single contact point on the sensor surface.

4. The apparatus of claim 3, wherein
   the plurality of lines comprise a first line, a second line adjacent to the first line, and a third line adjacent to the second line, and
   the hardware processor is configured to display an interval between the first line and the second line and an interval between the second line and the third line as having different lengths, in accordance with a shape of the locus of the single contact point on the sensor surface.

5. A displaying method of drawing a line corresponding to a contact on a sensor surface of a display, the method comprising:
- displaying a plurality of lines, based on a position of a single contact point on the sensor surface and a locus of the single contact point; and
- displaying an object in a color corresponding to the plurality of lines in a region near the position of the single contact point and on at least some lines of the plurality of lines,
- wherein widths of the plurality of lines are varied in accordance with a pressure on the single contact point, and
- wherein a position where the object is displayed and a shape of the object are determined in accordance with an interval of positions where the plurality of lines are displayed or a density of the plurality of lines.

6. The method of claim 5, further comprising stopping displaying the object when the contact on the sensor surface is not detected.

7. A displaying method of drawing a line corresponding to a contact on a sensor surface of a display, the method comprising:
- displaying a plurality of lines, based on a position of a single contact point on the sensor surface and a locus of the single contact point;
- displaying an object in a color corresponding to the plurality of lines in a region near the position of the single contact point and on at least some lines of the plurality of lines, wherein widths of the plurality of lines are varied in accordance with a pressure on the single contact point; and
- displaying a first line and a second line, in the plurality of lines, as having different widths, in accordance with a shape of the locus of the single contact point on the sensor surface.

8. The method of claim 7, wherein
- the plurality of lines comprise a first line, a second line adjacent to the first line, and a third line adjacent to the second line, and
- an interval between the first line and the second line and an interval between the second line and the third line are displayed as having different lengths, in accordance with a shape of the locus of the single contact point on the sensor surface.

* * * * *